(12) United States Patent
Kim

(10) Patent No.: US 8,176,472 B2
(45) Date of Patent: May 8, 2012

(54) SYSTEM AND METHOD FOR DEVELOPING SOFTWARE BASED ON BUSINESS OPERATING SYSTEM

(76) Inventor: Giloong Kim, Seoul (KR)

( * ) Notice: Subject to any disclaimer, the term of this patent is extended or adjusted under 35 U.S.C. 154(b) by 1527 days.

(21) Appl. No.: 11/649,589

(22) Filed: Jan. 3, 2007

(65) Prior Publication Data
US 2007/0157165 A1    Jul. 5, 2007

(30) Foreign Application Priority Data

Jan. 2, 2006  (KR) .................. 10-2006-0000075

(51) Int. Cl.
*G06F 9/44* (2006.01)
*G06F 7/00* (2006.01)

(52) U.S. Cl. ........ 717/113; 717/104; 717/105; 717/108; 717/109; 717/103; 707/601

(58) Field of Classification Search .......... None
See application file for complete search history.

(56) References Cited

U.S. PATENT DOCUMENTS

2004/0230559 A1* 11/2004 Newman et al. .......... 707/1
2006/0229888 A1* 10/2006 Colle et al. ............ 705/1
* cited by examiner

*Primary Examiner* — Lewis A Bullock, Jr.
*Assistant Examiner* — Mark Gooray
(74) *Attorney, Agent, or Firm* — Edwards Wildman Palmer LLP; Kongsik Kim

(57) ABSTRACT

A software development system according to the present invention comprises a business component storage layer for storing at least one business standard component of a program; a business component setting layer for setting attribute information of each business standard object, including object type, operating method, execution condition, execution sequence and database (DB) connection information; an application program execution layer for operating and controlling the object in the business component storage layer by the attribute information of the objects set by the user, and performing comparison, execution or calculation according to logic defined in script language; and an environment abstraction layer for controlling information technology (IT) infrastructure including an operating system of a computer, a central processing unit (CPU), a memory, a database management system (DBMS), network and display apparatus.

8 Claims, 8 Drawing Sheets

FIG. 8

| Icon | Function | Icon | Function | Icon | Function |
|---|---|---|---|---|---|
| | Run/Design. | | Lock. | | Line. |
| | Diagonal Line. | | Rectangle. | | Oval. |
| | Rounded Rectangle. | | Picture. | | Button. |
| | Label. | | Text. | | Radio. |
| | Date. | | Image. | | Progress. |
| | Scroll Row Index. | | EDMA. | | Group. |
| | Basic Approval. | | Schedule. | | OLE. |
| | Chart. | | Combo. | | Scroll. |
| | Tree. | | Scroll Condition. | | Searching. |
| | Check Box. | | Tab View. | | Tab Index. |
| | Grid. | | Pop Up. | | Align Left. |
| | Align Right. | | Align Top. | | Align Bottom. |
| | Align Middle. | | Align Center. | | Center Vertically. |
| | Center Horizontally. | | Horizontal Spacing Equal. | | Vertical Spacing Equal. |
| | Same Width. | | Same Height. | | Hyperlink. |
| | Show/Hide Ruler. | | Show/Hide Grid Lines. | | Form Property. |
| | Squit. | | | | |

SYSTEM AND METHOD FOR DEVELOPING SOFTWARE BASED ON BUSINESS OPERATING SYSTEM

CROSS-REFERENCE TO RELATED APPLICATION

The present application claims, under 35 U.S.C. §119(a), the benefit of the filing date of Korean Patent Application No. 10-2006-0000075, the entire contents of which are hereby incorporated by reference.

BACKGROUND OF THE INVENTION

1. Field of the Invention

The present invention relates to a software development system and a software development method based on a business operating system. More particularly, the present invention relates to a software development system and a software development method based on a business operating system, which enable even a user ignorant about program language to produce an application software by defining document contents (for example, a document form interface display) and business logics necessary for business activities of an enterprise.

2. Description of the Related Art

Social and economic changes progress rapidly with the advent of digital economy. A significant number of problems have been encountered in conventional development tools or methodologies used in the field of software technology. Most of the problems are associated with development or production of a large-scale and complicated business software that requires a higher level of productivity. Although many development methods have been made, they still do not solve the problems.

One serious problem of the conventional methods is that software developers have much to do at their end. More specifically, in the course of software development utilizing a conventional software development procedure or tool, a developer receives instructions from a demander (for example, a business-working staff or a software designer) and operates a source coding operation for incorporating a business logic. Also, the developer should form functions necessary to implement the business logic individually for each unit module, for example, database I/O, hardware control, operating system control or security management.

One additional problem is that such conventional technical paradigm has two erroneous premises that make software development inefficient.

The first erroneous premise is that "a developer receives instructions from a demander." In a typical course of development of a software, a business-working staff (mostly, a demander in the development of a business software) who has long-period experience and knowledge about work-site operation and clearly understands functions to be performed by a business software on demand gives instructions to a developer who handles complicated and difficult programming languages. As the demander and the developer have different expertises, miscommunication problem may entail. This problem may further be aggravated in a situation where substantial operations are entirely performed by a developer having no or less knowledge about important business logics. Likewise, it is impossible for a person with work-site knowledge to perform a source coding operation indispensable to an incorporation operation in software development.

As detailed below, the present invention gets rid of the premises of the conventional art. It brings an innovative change in the subject of software development and quality necessary for software development so that not an expert developer but a person having work-site business practical knowledge can play a central and essential role (it is not simply an increase of his/her role or responsibility in software development, but it means he/she practically produce a final software product).

The second erroneous premise of the conventional software development method is that "a developer should develop even unessential function of business software, for example database I/O, hardware control, operating system control or security management based on source code for each unit module." Typically, functions commonly used to all of the modules and business logics are mixed in a source code of software. In many cases, it involves numerous repeated operations for incorporating similar functions or difficult maintenance and management, which reduces the efficiency of software production. For instance, if a module A, a component of software includes a source code for incorporating functions such as database I/O, hardware control, operating system control and if a module B needs similar functions, a coding operation is required again.

As detailed below, a business operating system ("BOS"; complete platform specialized in business application software) of the present invention provides a technical basis that will eliminate the need of such coding operation for incorporating functions, for example, database I/O, hardware control or operating system control. That is, a developer (it does not mean a software expert developer of the past, but a staff having work-site knowledge) does not have to control sub-elements of software, and is able to concentrate on the essence of business software, i.e. business process incorporation.

That is to say, the BOS of the present invention innovatively corrects the two erroneous premises of the conventional software development method, and realizes a new software development paradigm that a business-working staff having business logic knowledge serves as a developer and concentrates on design and incorporation of business logic to develop business software.

Table 1 analyzes properties of software development tools and methodologies used in 1960s and thereafter and those of software development operation utilizing the BOS according to the present invention.

TABLE 1

| | Conventional development tools and methodologies | | | | The present Invention |
|---|---|---|---|---|---|
| Development method | Structural method | Information engineering method | Object-oriented method | Component-based method | BOS utility Method |
| Period | 1960–1985 | 1985–1995 | 1995–2000s | in the late 90s and thereafter | Present |

TABLE 1-continued

| | Conventional development tools and methodologies | | | | The present Invention |
|---|---|---|---|---|---|
| Main model | sequential business logic | Data | object | component | process and logical business logic |
| Tool | 3GL development language | 4GL development language | CASE tool, object-oriented tool | CBD tool | Software development platform and integrated authoring tool |
| Development and operation type | programming by coding | use of programming tool of GUI method | utility of automated tool by conventional sequential development methodology | S/W development by component generation and assembly | integration performance and management of design, development, test, documentation operation utilizing specialized operating system-embedded component and platform |
| Main technical environment | main frame environment, unit task computerization, software engineering quickening period | C/S environment, PC widespread popularization, enterprise-scale information system, relational DB | Internet spread, object-oriented language, distributed object technique | function unit component, J2EE and COM based technique, web service technique, application server technique | C/S, Web, Mobile environment simultaneous operating support, by business software specialized integration operating system, integration and automation of entire software development process |
| Advantages | standardized grammar, commonly utilizing technique, verified technique | theoretical basis of information engineering methodology, relative convenience of coding operation, relative convenience of database association operation | support of various software development methodology, real world conceptual model utility, utility of entire development cycle management technique | increase of production efficiency through reuse improvement | dramatic increase of software development productivity through guarantee of perfect reuse and reliability, enable a business knowledge possessor to S/W development operation through range expansion of a developer, and easy maintenance and management |
| Disadvantages | difficult to learn, difficulty in coding and maintenance and management, quality depends on ability of specialized developer, difficulty of uniform quality management | restricted grammar, complicated coding operation is required except for operation practicable by GUI method, quality depends on ability of an expert developer | non-standardization and complicated internal coding, lots of hand-operation, quality depends on ability of an expert developer | difficulty of component generation, problem of securing component reliability, difficulty of maintenance and management operation, component assembly needs an expert's help | |
| Main commercial products | COBOL BASIC C | PowerBuilder Delphi Visual Basic | Java C++ UML CORBA | MFC/CD, AURORA, COBALT, Cool: gen | |

Table 2 compares and analyzes properties of software development tools and methodologies used in 1960s and thereafter, and intrinsic design spirit of software development operation utilizing the BOS according to the present invention.

TABLE 2

|  | Conventional development tool (third generation and fourth generation development tool) | The present invention (fifth generation development tool provided by BOS) |
| --- | --- | --- |
| Target design of development tool | For programming, CPU, RAM or DB should be manipulated. But, it is difficult for even an developer to directly control CPU, RAM or DB with binary mechanical language. Thus, by simplifying common language easy to understand, it requires language devised to communicate with machine, The third generation and fourth generation development tools are made for this purpose and formed by combination of mechanical control code necessary to developers. | Develops all of element functions such as documents, approval, copier, or facsimile necessary to perform general business as standard objects beforehand and provide them in the type of perfect specialized operating system. Therefore, a program developer understands business phenomenon to perform, and selects the corresponding object and defines execution sequence and operation method to complete all programming operation. |
| Object of operation of developer | A developer should perform coding operation on each operations and functions to be performed by CPU, RAM, operating system (O/S) or DB necessary to implement an application program. | BOS performs functions for manipulating CPU or DB required for 'business standard objects' to operate properly, and thus a developer need not to perform an operation (a coding operation) related thereto and have time and mind to concentrate on business logic and process. |
| Ability and quality required to developer | A person ignorant of structure and principle of CPU, RAM or DB is not capable of program development operation. Only a minority of developers with aptitude and long-period experience is capable of program development operation. | It is possible to enable programming for a business-working staff of or a person understanding business logic as well as experts of the business process. Development operation based on 'BOS' according to the present invention changes the concept of the word, 'programming'. |
| Main object of research | It requires steady studying of IT based technique such as operating system (O/S) or DBMS and structure of hardware. Further, as technique develops continuously and new products are offered, it requires research, studying and mastery of development tool accordingly. | It eliminates the need for being interested in change of computer operating environment technique such as H/W, operating system (O/S) or DBMS, and allow to research industrial knowledge and know-how as factor determining function and quality level of software, and optimization of business process. |

As described above, software development tool and methodology utilizing the BOS of the present invention is different from the conventional software development tools and methodologies, ranging from the basic foundation to quality required for a developer and an object of research to be conducted in the future.

The conventional development tools and methodologies described above have the problems as set forth below.

(1) Repetition of Similar Operations

For software development processes and products produced by the conventional tools and methodologies, source coding operations of similar content are required to be repeated in many times. A significant number of developers share similar operations with each other and repeatedly perform the similar operations.

For example, in order for a simple business software to be developed, developers should implement various modules including, for example, data registering module, data retrieving module, or data analyzing and processing module. As even one type module for registering and managing data needs many different program modules according to the type, kind, or character of data, developers should thus implement all of the modules individually.

Furthermore, modules for inputting any kind of data are different in number or array order of input data, but they are substantially similar to each other in terms of function to be implemented, incorporating method and work load. Besides, though a management module consisting of data input routine, correction routine, deletion routine, reference routine, and output routine has repeated the tedious coding operations from the beginning to the end in order to incorporate any small difference in function between each of the routines, in spite of similar content of source code and repetition of same operation.

Thus, to form a small unit system for use in practical business, generally the number of program modules required for development operation ranges from several tens to several hundreds. Accordingly, it is inevitable that a developer spends much time and efforts in software development operation, and his/her working hours and development time and costs increase by geometric progression according to function and size of a particular software.

(2) Difficulty of Maintenance and Management

A more serious problem of the conventional software development methods is that many program modules are implemented as mentioned above, and thus correction of a trifle error or application of small improvement involves a lot of operations in spite of similar function and source code. For example, in case the developer corrects a registration routine, he/she should perform the same correction operation on a correction routine or an output routine containing the same logic. At this time, in the case that the developer does not reflect the content to a module or a routine due to his/her carelessness, it can adversely affect the stability and reliability of the entire program. For this reason, excessive efforts and high costs are required to construct a new system and maintain and manage a developed system.

Consequently, according to the conventional methods, business value of software development tends to be lowered and quality and stability of product software are hard to maintain excellent.

(3) Reduction of Operational Efficiency and Performance of System Resource

In addition to the problems described above, operational efficiency and performance of system resource can be adversely affected.

In particular, an invasion phenomenon of disc space becomes serious due to overlapping storage and management of lots of program modules having similar functions. Also, program modules or routines of similar functions are repeatedly loaded on a CPU or a main memory, and thus abuses occur; for example, waste of core resource becomes serious and response and process time becomes longer.

In addition, in today's Internet environment, stored in a server are modules of application program as well as data, message and document included in organization and shared through network. In this circumstance, as lots of program modules having similar function are taken and received through the most expensive common resource, i.e. network communication net, serious problems occur; for example, the traffic amount increases by geometric progression and the processing capability and response speed of all of the system forming organization are reduced.

(4) Lack of Fundamental Solution and Crisis of the Whole Industry

One more problem is that in spite of above-mentioned serious problems in the software development and operation, most of development tool or development methodology widely spread and used in the market took this contradiction for grant so far. Rather, efforts have been made only to increase investment of hardware such as server equipments or networks by geometric progression. For this reason, software business remains unable to achieve what is planned and predicted. In addition, software consumers feel the quality of products insufficient and instable, and the developer continuously repeats simple operations and regards overwork and extended project period as ordinary working condition.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above-mentioned problems of the conventional software production system and methods, with an idea that it is the best for a person having knowledge and experience about business process to directly and easily develop a software thereby to fundamentally improve and guarantee the quality of business software products.

To achieve the above objectives, the present invention devises a specialized operating system as an integrated development and operation platform in consideration of system operational efficiency by storing and managing minimum information necessary to drive business objects, i.e. components of software, as a separate structure file, and storing business objects for practically operating a program in a separate storage (inside the BOS) and operating the business objects.

Further, the present invention, instead of performing source coding operations, integrates functions for controlling hardware, database or operating system (O/S) commonly used in most of business software modules, in a specialized operating system type, and separates a part related to business logic and incorporates the part in a separate minimized script type, thereby improving the efficiency of software development and operation.

In one aspect, the present invention provides a BOS-based software operating system in which a user can select and define business standard objects in a graphical user interface (GUI) environment to generate and execute a business software. The BOS-based system comprises: a business component storage layer for storing at least one business standard object having a specific function forming a program for defining the function of the program by the user's selection through a GUI interface; a business component setting layer for setting attribute information of each of the objects, including object type, operating type, execution condition, execution sequence and database (DB) connection information; an application program execution layer for operating and controlling the object in the business component storage layer by the attribute information of the objects set by the user, and performing comparison, execution or calculation according to logic defined in script language; and an environment abstraction layer for controlling information technology (IT) infrastructure including an operating system of a computer, a central processing unit (CPU), a memory, a database management system (DBMS), network and display apparatus. The BOS serves to select and use functions of the business standard objects provided under the GUI interface environment in a graphic object type (including icons, menu or tools). Thus, even a user having no software development skills can easily design and implement a program execution function based on its business process knowledge, and builds the business standard objects without a coding operation thereby to complete a final execution program.

Preferably, in the case that the business standard object is selected and built by the user, the program execution layer automatically generates the execution files (structure data files) by the attribute information set by the user in the business component setting layer thereby to complete a software development operation, which removes simply repetitive program operations such as coding, compiling or debugging.

In a preferred embodiment, the BOS divides the business software structure into: mechanism function for controlling IT infrastructure including hardware device and operating system, communication protocol, DBMS input and output; and business logic function including general business processing rule, transaction condition and commercial transaction practice. The mechanism function is provided beforehand in the BOS to all of the developers and users so that any business software once developed is not developed again, but is reused. The business logic function is stored in a file type or DB type for each application program module unit and executed by the program execution layer.

In another aspect, the present invention provides a business software development method based on BOS by which a user can select and define business standard objects in a GUI environment to generate and execute business software. In a preferred embodiment, the BOS-based method of the present invention comprises: (S1) receiving and generating a user interface display of a new program; (S2) selecting at least one business standard object of a program from a business component storage layer to determine the size and position of the object on the display; (S3) receiving attribute information including object type, operating type, execution condition, execution sequence and DB connection information of the individual object from the business component setting layer; (S4) converting information set in the steps (S2) and (S3) to structure data of an interpretable type by the program execution layer; and (S5) reading the structure data and operating the object on the display according to the user's command in conformity with information set in the steps (S2) and (S3). In the method, the BOS serves to select and use function of the business standard objects provided under the GUI interface environment in graphic object types (including icons, menu or tools) so that even a user having no software development skills can easily design and implement a program execution function based on business process knowledge, and builds the business standard objects without a coding operation thereby to complete a final execution program.

Further, the present invention provides an authoring system which implements in advance all of the functions necessary for business software development as standardized unit objects and stores them in a business object storage so that business logic interested parties define a necessary function directly and incorporate a final interface display using a separate exclusive development tool without source coding operation.

Also, the present invention provides an operating system which puts only minimum information defined by a developer in the authoring system in a structure data file, stores, transmits and manage the information, and during software operation, analyzes the structure data file generated by selection of a user on driving software and operates related business objects in the defined order.

Other aspects of the invention are discussed infra.

BRIEF DESCRIPTION OF THE DRAWINGS

These, and other features and advantages of the invention, will become clear to those skilled in the art from the following detailed description of the preferred embodiments of the invention rendered in conjunction with the appended drawings in which like reference numerals refer to like elements throughout, and in which:

FIG. 8 is an example view of the business standard objects in accordance with a preferred embodiment of the present invention.

DETAILED DESCRIPTION OF THE PREFERRED EMBODIMENTS

Figure 1:
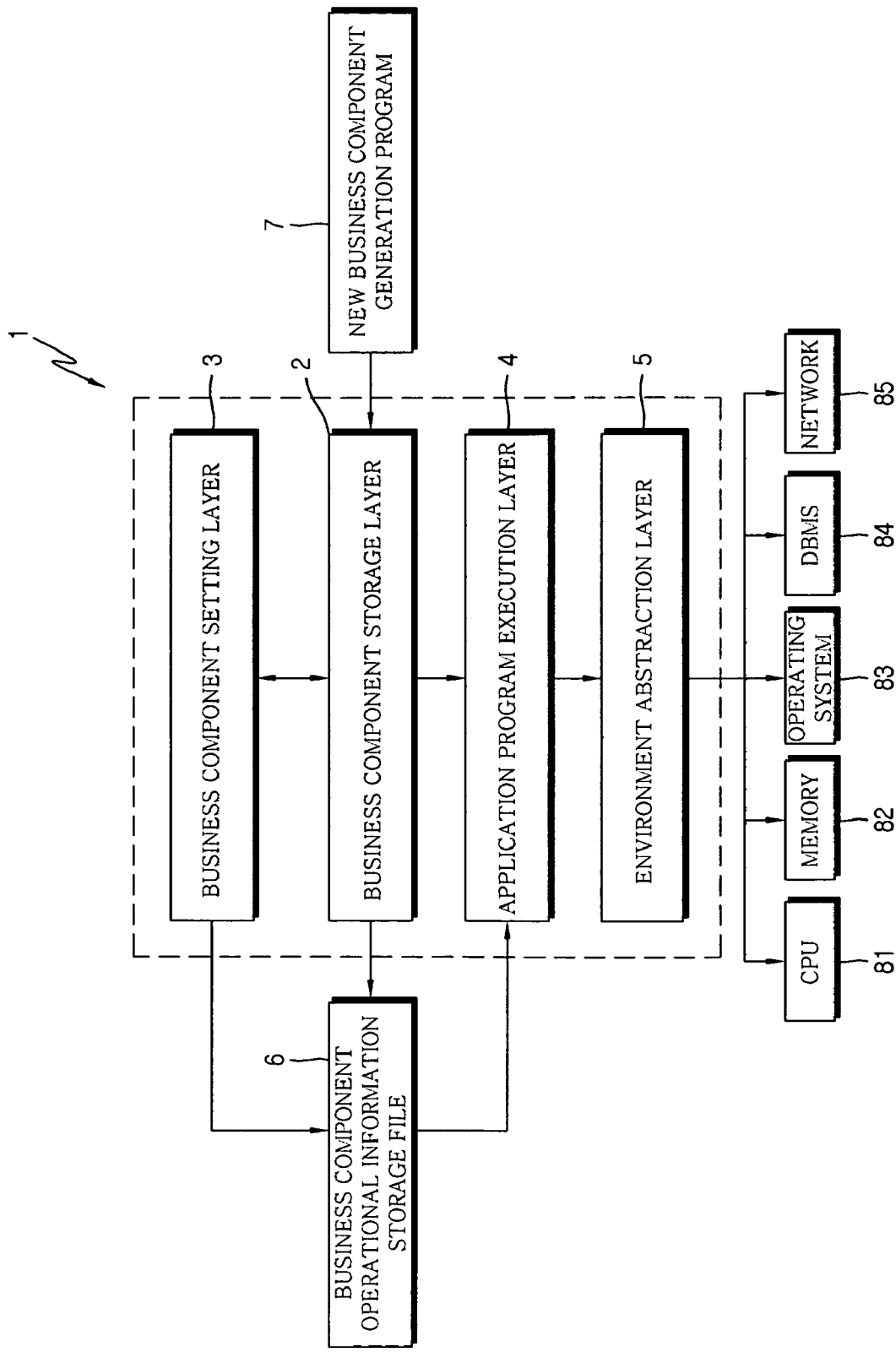
FIG. 1 is a functional block diagram of a software development system based on a BOS in accordance with a preferred embodiment of the present invention.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 6:
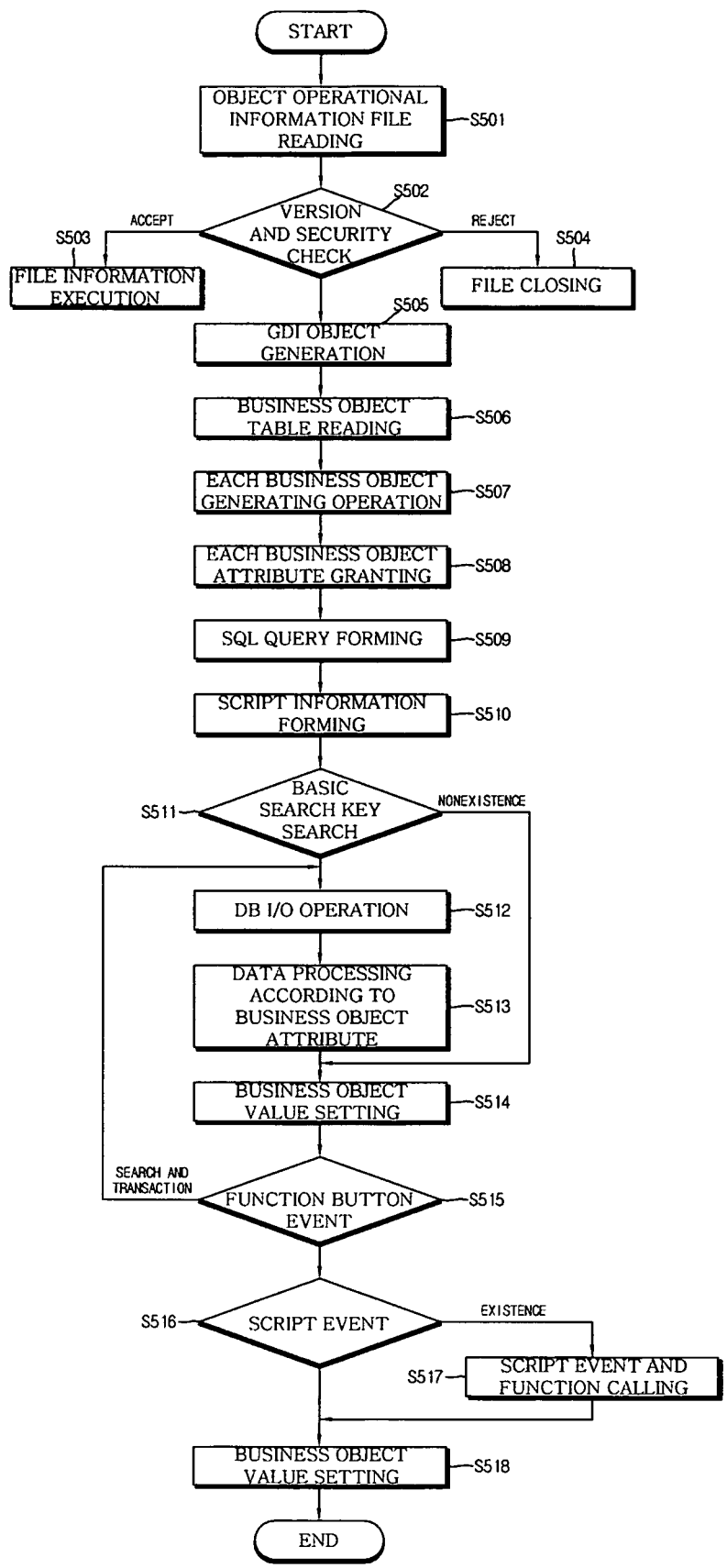
FIG. 6 is a detailed flowchart of a step for operating the structure data file in accordance with a preferred embodiment of the present invention.
Figure 7:
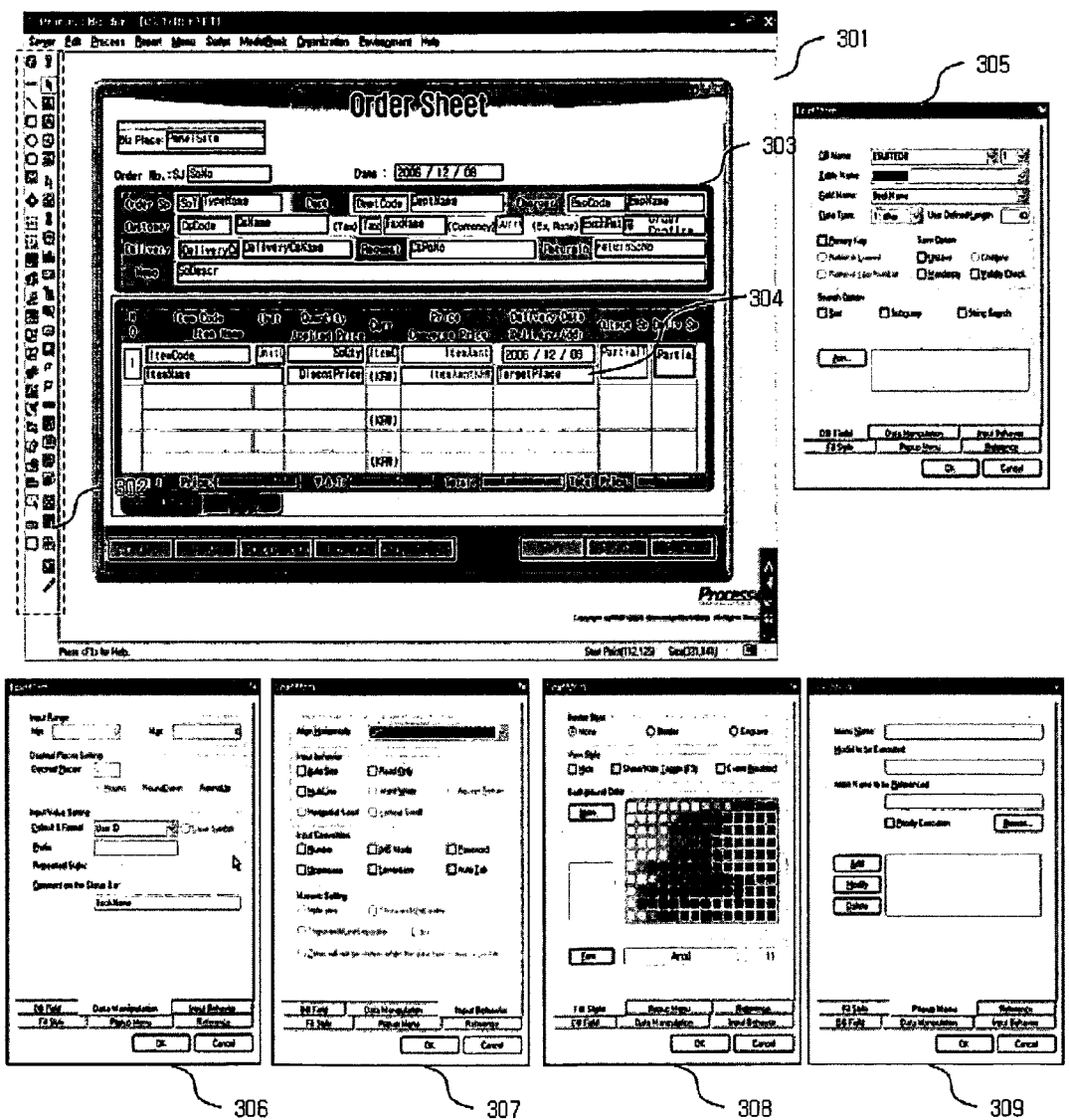
FIG. 7 is a view illustrating the captured display defining business standard objects in accordance with a preferred embodiment of the present invention.

The accompanying drawings includes i) block diagrams of a system consisting of sub-elements (FIGS. 1 to 3), ii) flowcharts illustrating logical development phase (FIGS. 4 to 6), and iii) example displays illustrating each program of a software authoring system utilizing the present invention (FIGS. 7 and 8).

In one aspect, as discussed above, the present invention provides a BOS-based software development system. FIG. 1 is a functional block diagram of a software development system based on a BOS in accordance with an exemplary embodiment of the present invention.

A BOS-based software development system 1 according to an exemplary embodiment of the present invention comprises a business component storage layer 2, a business component setting layer 3, an application program execution layer 4 and an environment abstraction layer 5. Also, the system 1 controls subordinate devices, for example, a CPU 81, a memory 82, an operating system (O/S) 83, a DBMS 84, and a network 85, and includes a business object operation information storage file 6, i.e. an essential information file generated in each interface display unit in the BOS.

The business component storage layer 2 stores at least one business standard object forming a software program. Here, the business standard object is selected for a user to perform business logic and indicated in graphic to the user, and has a specific function therein (See FIG. 8).

When the user incorporates an interface display, the business component setting layer 3 selects a necessary business object among the business objects stored in the business component storage layer 2, arranges it on the display, and sets attribute information of the object including object type, operating method, execution condition, execution sequence and including DB connection information (See FIG. 7). Also, when a developer forms the interface display, the business component setting layer 3 bundles the setting information of the corresponding display to generate the business object operation storage file 6 of a separate structure data file (See FIGS. 3 and 5).

When practically operating the developed software, the application program execution layer 4 reads the business object operation storage file 6 and interprets information set by the developer, and fetches a necessary business object from the business component storage layer 2 and operates the business object according to the defined setting information.

When executing software in the application program execution layer 4, the environment abstraction layer 5 controls and utilizes each function of the subordinate devices of the BOS, for example, the CPU 81, the memory 82, the operating system (O/S) 83, the DBMS 84, and the network 85 according to the attribute information set.

Preferably, an inner part of the system 1 based on the BOS is divided into a physical storage by the business objects (the business component storage layer 2), a part for defining the operational attribute of the business object according to functions required by the interface display to be developed (the business component storage layer 3), a part for controlling an operation related to business logic performed by the business object (the application program execution layer 4), and a part for separately controlling sub-system commonly used by the business objects (the environment abstraction layer 5), thereby minimizing overlapping operations or the operative inefficiency in software development.

In addition, the business component generating program 7 of FIG. 1 generates a new business object as a standardized object, in the case that business objects indispensable to the BOS do not have necessary function. The BOS according to the present invention generates a new business object using languages, for example C, C++ or Java.

Figure 2:
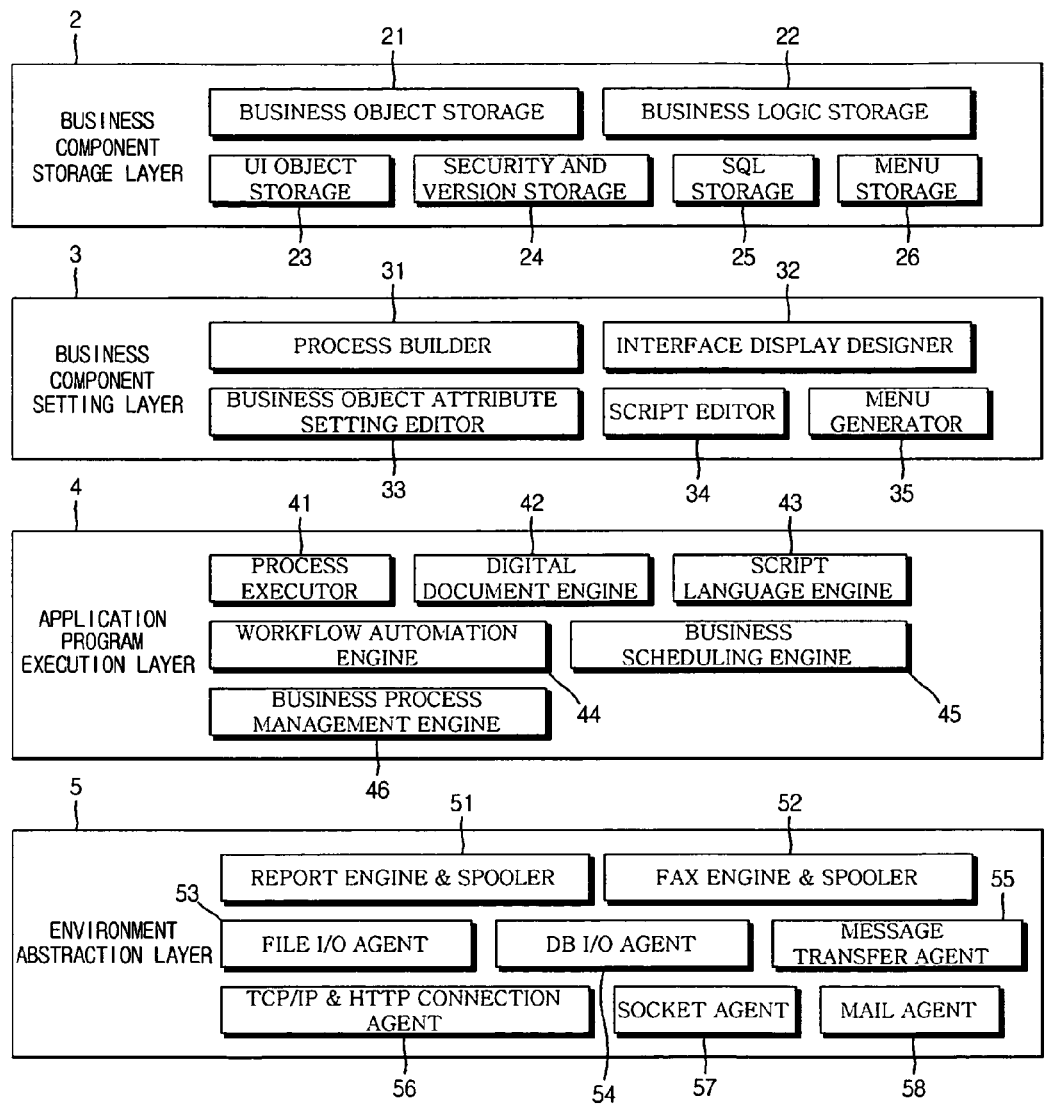
FIG. 2 is a detailed functional block diagram of FIG. 1.

FIG. 2 is a detailed functional block diagram of the software development system 1 based on the BOS of FIG. 1.

First, the business component storage layer 2 comprises a business object storage 21 for storing the business objects generated using a business object generating program to easily find and interpret the business objects, a business logic storage 22 for storing script logic for incorporating a complicated business rule, a UI object storage 23 for separately storing UI attribute (i.e. size, color or font represented on the display) of the business objects, a security and version storage 24 for managing the content related to security and version set in each business object or set on the interface display, a SQL storage 25 for storing and managing SQL statement generated according to a combination of business objects, and a menu storage 26 for storing menu organization of the interface display formed by a menu generator 35.

The business component setting layer 3 comprises a process builder 31 (See 301 of FIG. 7) for incorporating business process through construction, arrangement, type setting and attribute setting of the business objects according to business logic required by the user, an interface display designer 32 (See 303 of FIG. 7) for setting the size and location of the business object for the demand of the user and the convenience of use, a business object attribute setting editor 33 (See 305-309 of FIG. 7) for setting the detailed attribute of the business object, a script editor 34 for defining a complicated business rule unable to define by a basic attribute provided by the business object or defining and compiling an event generated according to operation of the business object, and a menu generator 35 for generating an execution menu for bundling each of the interface display into a single menu organization.

The application program execution layer 4 comprises a process executor 41 (See FIG. 6) for interpreting and executing the business object of the interface display, a digital document engine 42 for interpreting and executing documents such as electronic payment document, a script language engine 43 for interpreting and executing script data generated by the script editor 34, a workflow automation engine 44 for operating the business objects in conformity with workflow logic when performing business process involved by many users, a business scheduling engine 45 for managing time-set business objects to perform schedule management and automatic execution function according to time, and a business process management engine 46 for setting the execution sequence of business process and operating an application program to be performed to share and execute front and rear program modules and data.

The environment abstraction layer 5 comprises a report engine & spooler 51 for managing printed materials and support output, a fax engine & spooler 52 for controlling facsimile, supporting output, and automatically receiving data from the interface display and outputting the data, a file I/O agent 53 for supporting easy access to file, a DB I/O agent 54 for performing connection of database to a database management system and transaction processing, a message transfer agent 55 for supporting message processing and message transfer, a TCP/IP & HTTP connection agent 56 for supporting communication protocol and Internet connection, a socket agent 57 for supporting easy access to remote data, and a mail agent 58 for supporting an object required for mail transfer function among business objects.

Figure 3:
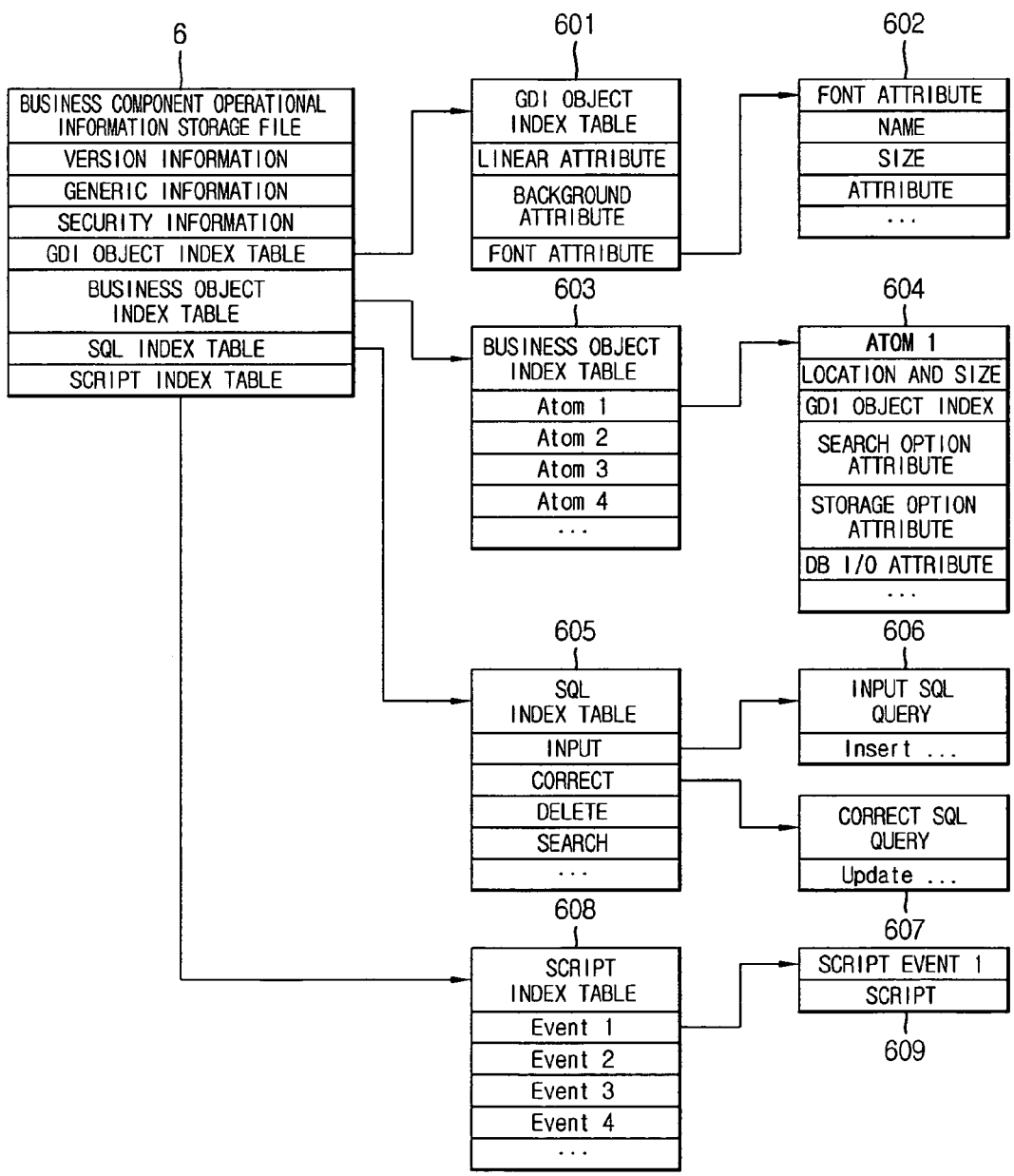
FIG. 3 is a block diagram of a structure data file in accordance with a preferred eembodiment of the present invention.

FIG. 3 is a block diagram of a structure data file in accordance with an exemplary embodiment of the present invention, and its detailed description will be made below on describing FIG. 5 for more effective description.

Figure 4:
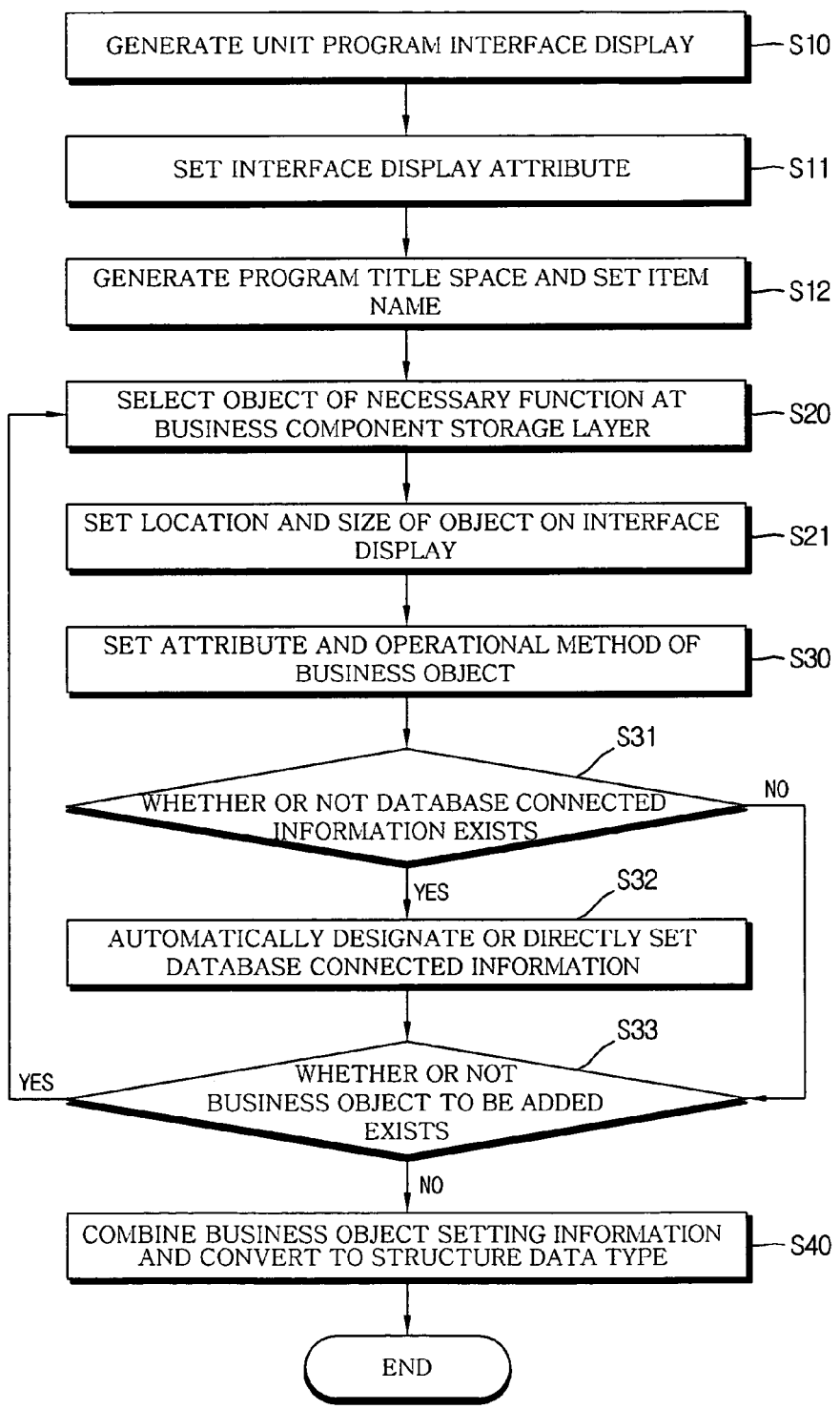
FIG. 4 is a flowchart of a software development method based on a BOS in accordance with a preferred embodiment of the present invention.

FIG. 4 is a flowchart of the software development method based on the BOS in accordance with an exemplary embodiment of the present invention.

As shown in drawings, the software development method based on the BOS according to the present invention begins with generating unit program interface display, ending with converting the setting information of unit objects of the corresponding interface display to the structure data type without using any source code.

The unit program interface display generating step (S10) generates an input and output display (See 303 of FIG. 7) that end-users will use practically through development and authoring tools (See FIG. 7) of GUI method usable by users (for example, process analyzers or business logic interested parties) having no professional software technique such as coding. Here, the physical entity of the input and output display can be seen in a specific type file (See 6 of FIG. 1) containing information about design elements (i.e. color, font, size and arrangement of pattern) of the display with structure data to be finally formed.

The interface display attribute setting step (S11) sets the whole attribute of the interface display generated in the step (S10) and the design elements of each interface display by the user. This step is also quickly performed using the development and authoring tool (See FIG. 7) of GUI method provided by the BOS.

The program title space generating and item name setting step (S12) generates spaces for the title of the interface display generated in the step (S10) and the title of items represented on the corresponding display. The title space or item space is provided in business standard object (See FIG. 8) type having the completed development tool according to the present invention.

Once the display is generated, the design elements are set and the title and item spaces are generated, the whole frame of the interface display for end-users is completed.

Now, the method selects an object of necessary function among the business standard objects stored in the business component storage layer 2 of the development tool of the present invention as shown in FIG. 1 (S20), and sets the location and size of the object on the interface display (S21). The business standard objects of the present invention are represented as icons in the development tool (See 302 of FIG. 7), and the user clicks a necessary object among the business standard objects and generates it on the interface display in a drag & drop method.

After the object is generated and its location is set, the method sets the attribute or operating method of the business object through an attribute setting display (305-309 of FIG. 7) that is provided each kind of the corresponding object controlled by the business component setting layer 3 (S30).

And, if the corresponding business object is connected to database and is operated (S31), the method may directly set database connection information through database connection information setting window (See 305 of FIG. 7) or automatically designate database connection information utilizing automatic designation function of the present invention (S32).

After the above steps (S20-S32) are performed on a single business object, the method reviews whether or not any further function is necessary (S33), and if further function is necessary, the method performs the above steps (S20-S32) on an object of necessary function from the business component storage layer 2 (See 302 of FIG. 7). And, if further function is unnecessary, the method stores the corresponding display, combines the set information and converts the information to the structure data type (S40).

The software development method based on the BOS according to the present invention stores all design and setting information in the structure data type file 6 formed through the above steps, but does not store the business object itself. The method thus can maximize the whole operative efficiency, even if a large scale system is developed through minimization of a physical data file. And, when practically operating software, the method represents the interface display according to the setting information stored in the structure data file, and if the business objects included in the display is subject to command manipulation of the user, the method fetches business objects in the business component storage layer 2, interprets the user's command and attribute information set previously and operates the business objects accordingly.

Figure 5:
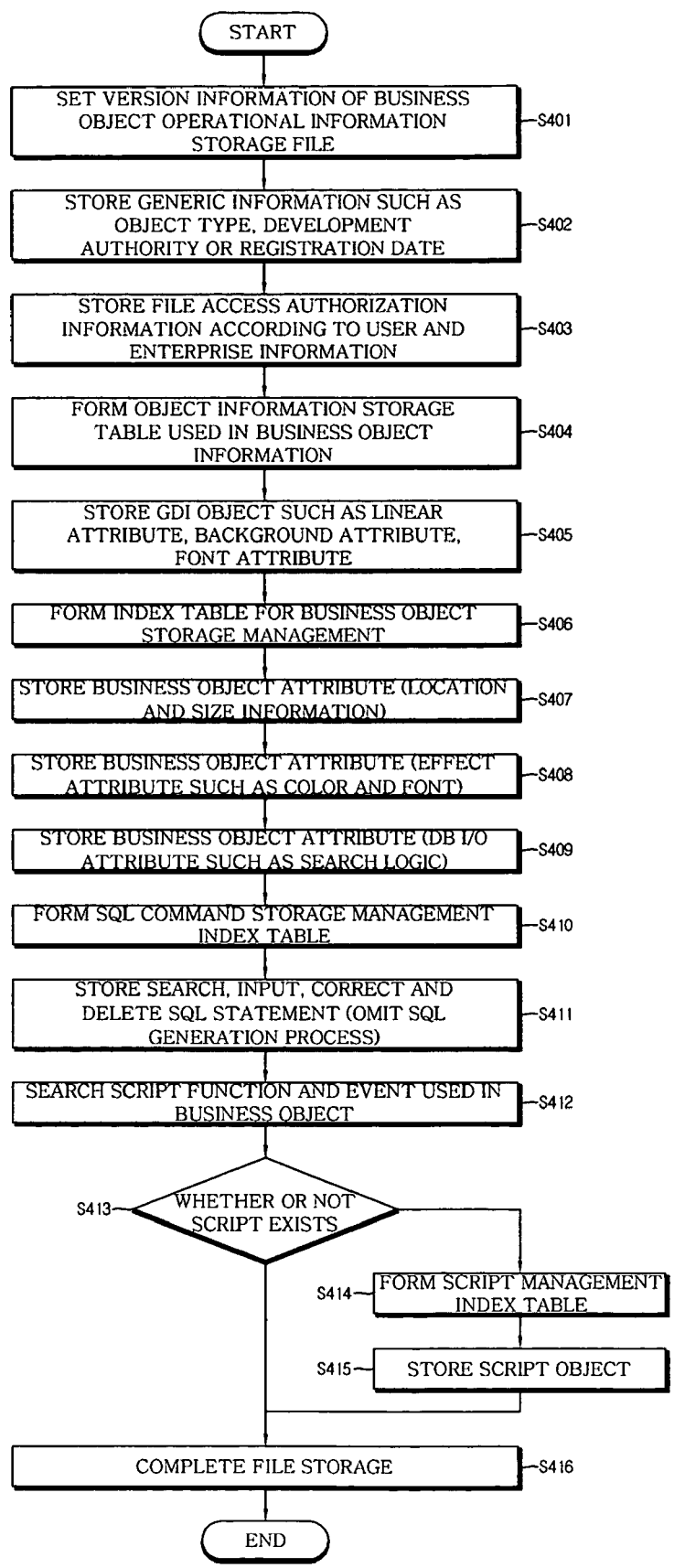
FIG. 5 is a detailed flowchart of a step for converting and storing the structure data file in accordance with a preferred embodiment of the present invention.

FIG. 5 is a detailed flowchart of a step for converting and storing the structure data file 6 in accordance with an exemplary embodiment of the present invention. FIG. 3 is a block diagram of the structure data file.

FIG. 5 illustrates logic and flowchart for forming information set for the developer to perform a desired function in the business component setting layer 3 (See 305-309 of FIG. 7) as the business object operation information storage file 6 of a separate structure file. FIG. 3 illustrates the data structure of the business object operation information storage file 6 corresponding to a software application program of the present invention.

That is to say, when the user completes the setting operation on the interface display for making a single software utilizing the function of the business component setting layer 3, the steps of FIG. 5 are performed automatically to generate the business object operation information storage file 6 of the type as shown in FIG. 3, and the business object operation information storage file 6 is interpreted when practically operating software (See FIG. 6).

A step for setting version information of the business object operation information storage file (S401) stores the version of the BOS operating system under usage and version information of the development tool (See 6 of FIG. 3). A step for storing generic information such as object type, development authority or registration date (S402) stores generic information, for example the type of the corresponding interface display, development authority, developer information or development date. A step for storing file access authorization information according to user or company information (S403) stores security information 6 for managing whether or not the corresponding interface display should be executed according to organization class or user's grade. A step for forming a graphic device interface (GDI) object information storage table used in the business object information (S404) grasps the type of font, linear or color used in the background attribute of the interface display or linear or font attribute of the business object of the display to form the DGI object information storage table 601 as an index table. A step for storing the GDI object (S405) separately stores the name, size and detailed attribute for each type of linear, background or font of the display grasped in the step (S404) together with index number of the GDI object information storage table.

Now, description is made about steps for storing information of the business objects of the interface display as follows.

First, the business object operation information storage file 6 does not store the business object itself, but information that grants any business object with any operation attribute to operate the business object, and thus an index table 603 is formed for storing and managing the business object (S406). The index table 603 stores the type and inherent number (index number) of each business object of the interface display.

When the business object index table 603 is generated, a table 604 is required to store the detailed attribute information for each business object. And, this table 604 stores the location and size of the corresponding business object (S407), GDI object effect attribute including color or font used in the business object (S408), and attribute related to database input and output such as search logic (S409). In the case of business object necessary for database input and output, SQL statement is required to perform the corresponding operation (S410). The software development method based on the BOS according to the present invention analyzes attribute information of the business object through a separate internal logic, automatically generates a proper SQL statement, and manages the SQL statement using the index table 605. Thus, the method forms a SQL command storage management index table (S410), grants an index number to the SQL statement used in the corresponding interface display, and stores the text of the SQL statement using separate tables 606 and 607 (S411).

Generally, the business component operational information storage file 6 is generated through the above steps (S401-S411). The interface display containing relatively complicated business rule or event uses script. The method searches (S412) whether or not script function or event exists. If script function or event exists, the method generates an index table 608 for effective management of script and a separate table 609 for storing the entity of script (S414), and stores the script (S415).

After completing the above steps, the method bundles version information, generic information, and security information of the interface display, and information about GDI object, business object, SQL statement and script statement, and stores them as a separate file type.

FIG. 6 is a detailed flowchart of a step for operating the structure data file in accordance with an exemplary embodiment of the present invention. This process is performed in reverse order of the process for forming the business component operation information storage file 6 shown in FIG. 5.

First, if the user selects a desired function among items of menu of software, the method executes the corresponding business component operation information storage file 6 to execute the interface display connected to the corresponding function (S501).

At this time, the method reads the version information (S401 of FIG. 5) and security information (S403 of FIG. 5) of the corresponding file and checks if the version information and security information meet the condition (S502). If they do not meet the condition, the method does not execute the file (S504). On the other hand, if they meet the condition, the method reads structure information within the file (S503).

First, the method reads the GDI object index table (See 601 and 602 of FIG. 3) and generates the GDI objects used in the business object of the corresponding interface display (S505). The method reads the business object index table 603 (S506), and generates all of the business objects on the display in conformity with predetermined location and size, font attribute or linear attribute (507).

The method grants the detailed attribute in the business object information entity storage table 604 to the business objects (S508). The method reads the SQL index table 605 and SQL statement entity storage tables 606 and 607, and forms an SQL query necessary to the corresponding interface display (S509). If information 608 and 609 related to script exists in the corresponding file, the method reforms it as an executable type (S510).

The above steps (S501-S510) interprets the content stored in the business component operation information storage file 6, and represents or stores necessary information on interface display or memory. Then, the user performs a necessary operation while watching the display (S511), and subsequent steps will be described below.

First, if a basic search key is set on the corresponding display (S511), the method reads a final data from database or generates the next record number to prepare to receive a new data (S512). At this time, if indication attribute is set in each business object, the method processes data in conformity with the condition and displays the data on the display (S513).

If the basic search key is not set, the user inputs data (S514) or uses a function button such as a search button (S515). If database input and output is required for the business object used by the user, the method performs the corresponding operations (S512 and S513). If script exists and script event is required for the business object used by the user (S516), the method performs (S517) a necessary part of the script information constructed in the step (S510) and displays the execution value on the display (S518).

FIG. 7 is a view of the captured display defining the business standard objects in accordance with an exemplary embodiment of the present invention, and shows the outer part of the business component setting layer 3 based on the BOS.

First, the display 301 is a main display of the process builder (See 31 of FIG. 2) for incorporating business process through configuration, arrangement, type setting and attribute setting of the business object according to business logic required by the user. The menu 302 is an icon menu for selecting the business objects formed as standard objects and provided by the business component storage layer 2. The display 303 is an interface display itself that an end-user contacts and is controlled by the interface display designer 32. A data field 304 is an example of a data input space object as one of many business standard objects provided by the present invention, and includes field attribute setting tab 305, input attribute setting tab 307, drawing attribute setting tab 308, and additive function setting tab 309 for supporting to set detailed attribute information of the corresponding object.

FIG. 8 is an example view of the business standard objects in accordance with an exemplary embodiment of the present invention.

Four advantages obtained by the present invention will be described below, citing experimental examples.

(1) Improvement of development speed and reduction of development cost of business software development In the case of development of application software based on the BOS, the present invention eliminates the need that a developer performs a coding operation on each of necessary functions. Instead, the present invention forms all of element functions necessary to incorporate application software as business standard objects, and provides them in the type of operating system beforehand, thereby essentially changing the development operation method.

Besides, the present invention implements a single authoring tool to all of the steps from a initial design step to final implementing and test operations related to the development operation based on the BOS. As such, the present invention provides an innovative development methodology that eliminates overlapping operations of software development process and utilizes output produced in the previous step as source information in the next step, and in the end dramatically improves software development productivity.

In particular, the authoring tool embedded in the BOS based system is based on a robust GUI, so that even a person having no programming skills or knowledge can easily use the authoring tool. Thus, once the developer directly draws the type of an input/output display and report used finally by an end-user and simply defines the operating method, the developer almost completes his/her job in developing the system.

Therefore, the present invention eliminates complicated processes and repeated manipulation processing steps, for example separate coding, compiling or debugging without the concept of source code or object code used in the conventional development tool. Such an innovative access method considerably reduces costs and time required for software development and prevents repeated trial and error or error occurrence thereby to reduce the whole costs for software development project.

To prove that the BOS based software development improves the development productivity, simple application development testing was performed on the BOS based system and Visual C++ widely used as the conventional software development tool. The test results are shown as follows.

As an example is taken a "book lending management" program including an 'employee' module and a 'book lending' module. It is assumed that DB organization necessary to incorporate program is designed and generated beforehand, Visual C++ developer is a first graded programmer of three years of Visual C++ development experience, and a developer utilizing the 'BOS' is an industrial engineering degree of no programming experience, i.e. an ordinary person majoring except computer engineering having three-month experience of using tool (i.e. ProcessQ).

The below table 3 shows comparison results of whole development time and performance of source code and output.

TABLE 3

|  | BOS based system | Visual C++ |
|---|---|---|
| developer | Industrial engineering degree of no experience of programming and three month experience of ProcessQ | first graded programmer of three years of Visual C++ development experience |

TABLE 3-continued

|  | BOS based system | Visual C++ |
| --- | --- | --- |
| required time | 45 minutes | 72.5 hours |
| output | Employee module<br>book lending module<br>employee and book<br>information retrieving display<br>module | employee module<br>book lending module |
| source code | None | 4,573 lines<br>(A4 paper 89 pages) |

As shown in the above table, in aspect of development productivity, development operation performed based on the BOS was about 90 times as high as development operation performed using Visual C++, even though development operation performed based on the BOS additionally develops a display for retrieving employee and book information. Besides, after many tests and application to a practical project, in the case of low degree of difficulty of development, it is noted that the differences in productivity amounts to 100 times or more on an average, and in the case of development of enterprise solution level high-performance software, productivity increases about 30 times on an average.

(2) Improvement of the quality of business software utilizing standard objects specialized in business field Business application for automating all business activities and business processing function of industrial field has various types of systems, ranging from common system such as ERP, CRM or SCM to OA solution such as EDMS or an electronic payment system and knowledge management solution such as KMS or Groupware, and each system includes lots of functions. Thus, in aspect of software development, modules to be implemented are huge, and process and DB structure is complicated.

But, the business software development operation is designed in a top-down method and implemented in a bottom-up method by different persons, and in this case, knowledge or intention of a designer may be improperly expressed or transferred to the developers, and thus it occurs various types of communication errors and gap between design and incorporation. Further, lots of modules are implemented in bottom-up method by a plurality of people over long term, and thus inevitable design change occurs frequently, thereby increasing by geometric progression the amount of operations, for example changing the function and DB structure of all of the related modules for trifle design change and function adding operations. But this problem is not solved fundamentally and sufficiently by development methodology based on a complicated development tool and abstruse coding operation. In other words, lots of overlapping operations and error processing extend the project period and increases costs rendered here. Therefore, it requires a turnover for viewing software technology in dimension of development tool or development methodology to eliminate repeated and complicated procedures such as coding and enable to research and deliberation of business itself (business knowledge).

To meet the demand of software market, the present invention systematically researches the repeated functions and extracts all element functions necessary for business software development to form as 'business standard object'. The present invention provides the business standard object in the type of stable and optimum platform and operating system through standardized and universalized operation, thereby reducing error occurrence and differentiating the quality of products to improve the competition power of software industry. Further, in software development and operation based on the 'BOS', developers do not have to use function and service of hardware, communication protocol or operating system or perform the repeated coding operation for data store and search.

Therefore, the present invention allows even a person having no program language experience to easily and quickly develop software suitable for requirements of business field, if only the person has practical experience or knowledge. In addition, if a person has program development experience, the person can quickly and conveniently develop software of higher performance than ever based on accumulated sense and experience about development business, and industrial practical knowledge acquired in the process of development in the past.

The development system and development method based on the BOS according to the present invention brings an innovative change in dimension of platform and operating system thereby to dramatically increase the function and quality level of output, i.e. application software products. To introduce the system, enterprise or staff needs various and advanced functions provided in the type of 'business standard object' by the present invention, and digital management system can be realized by support of such function. However, so far software development project needed the conventional development tool, for example PowerBuilder, Delphi, BASIC or COBOL, and thus the conventional software development project spent lots of time and costs, and goes through trial and error.

Further, even though the functions are implemented, the functions have many exceptions and reduce field applicability or stability of the system and are formed of complicated and various structures, and thus they have lots of another problems in effective utility.

However, the present invention forms functions of high performance required in industrial field as standard objects and in the type of embedded in a specialized operating system, and maintains high level of price competition, thereby easily incorporating functions of software within a short time, for example several minutes.

Therefore, when developing software based on the BOS, products developed by the present invention establish differential superiority in aspect of the function and quality of the finally produced software, compared to products developed by the conventional development tools. As for software development businessmen, the present invention achieves superiority over competitors in terms of the quality and function of product thereby to allow the businessmen to hold a dominant position in order competition and maintain high level of price competition.

(3) Incorporation of development platform for a business process expert short of programming technique to be capable of developing user-oriented business software of high performance To date, software program can be developed only by an expert who has acquired knowledge about programming languages and underwent trial and error which may occur during coding operational error debugging operation of several hundred to several thousand lines. But, it is likely unreasonable that an expert developer having no knowledge about business process develops a software having a special object of management innovation and improved efficiency such as business software.

For this reason, the conventional development methodology involves a step that a developer having no business knowledge is handed knowledge from staff who understands the corresponding business knowledge and business process, and separately uses tools for each step such as DFD, UML, ERD to support and schematize communication from a highest step to a lowest step of development. Further, difficult and abstruse programming languages block the staff in charge of work-site, i.e. an end-user who understands best work-site process from participating in the development process, and software development requires understanding of mechanism, algorithm or operating principle related to hardware, DBMS and data communication. This technical problem prevents the staff in charge of work-site from serving as the substantial subject of development.

In other words, business software development essentially and fundamentally needs knowledge about business process or industrial activity, but there is a fundamental problem that development tools used in software development are not configured for a process expert, but for a software development technique expert. Thus, the developer spends time and efforts to acquire and handle programming technique and tools while losing the fundamental goal of management innovation and improved business process. But, in spite of such efforts, the final output does not reflect the demand of the user properly, and moreover, introduction of such a system does not solve trial and error and inefficiency, for example failure to obtain substantial effect.

Therefore, the present invention has devised and designed the 'BOS' as a new concept of business software development platform so that an expert having knowledge about business process can easily and quickly perform development operation in conformity with the fundamental goal of software. Accordingly, business process expert selects functions necessary for software development among standard business components provided by the 'BOS', simply designs the function using GUI method and designates operation method, thereby developing object-oriented application quickly.

(4) Separation of mechanism function for controlling H/W and operating system (O/S) from business logic essential to an application program to increase the efficiency of software development and operation and realize systematic knowledge accumulation As contrasted with the conventional art in which the entity of program is source code, the entity of program of the present invention is an interface display generated based on the BOS. This means 'information group' having a predetermined form and structure for definitely expressing processes or activities, for example business knowledge, business processing know-how, document form, business processing function for each step, business rule, commercial trade practice, workflow sequence, or roll of each staff.

Practical operation of any program based on the BOS means that the user selects and displays a display corresponding to menu or function among interface display stored and managed in file or record type, and operates the display in the similar manner to general program module. As such, the BOS environment changes basic environment and method for producing and operating business software thereby to fundamentally solve the problems of the conventional software resulted from a complicated mixture of many functions for operating and controlling hardware or various devices and content for defining business process and activities.

In brief, the BOS provides functions for operating and controlling hardware and various devices in the operating system type, thereby eliminating the need for coding operations for incorporating the functions. Also, the BOS provides technical infrastructure to construct a huge 'industrial knowledge and process database' for separating industrial knowledge, know-how, business process from the functions, systematically generating and storing industrial knowledge, know-how, business process and executing them immediately at necessary point.

Further, the present invention fundamentally changes the efficiency structure of software development operation, so that the developer can be trained more easily and various fields of software products can be produced. That is, the present invention provides solution for solving serious software famine phenomenon encountered in most industries, and concentrates essential ability necessary to business software developer on industrial knowledge or knowledge or experience about business process contained in product to be incorporated instead of incorporating technique or incorporating method. Ultimately, the present invention provides robust technical infrastructure for changing technical-centered software industry to knowledge-centered software industry, and brings innovation to production system and production efficiency structure of software industry having boundless potentialities for development.

The software development system and method based on a BOS according to the present invention have been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A business software development system based on a business operating system (BOS), in which a user selects and defines at least one business standard object in a graphical user interface (GUI) environment to generate and execute business software, the BOS comprising:

a business component storage layer for storing the at least one business standard object for defining a specific function of a program and defining the function of the program selected by the user through a GUI interface, wherein in the case that the business standard object is selected and built by the user, an application program execution layer automatically generates an execution file by attribute information set by the user in a business component setting layer thereby to complete a software development operation, which removes worrisome repetitive program operations including coding, compiling or debugging;

wherein the business component setting layer for setting attribute information of the at least one business standard object includes object type, operating type, execution condition, execution sequence and database (DB) connection information by the user;

wherein the application program execution layer for operating and controlling the at least one business standard object in the business component storage layer by the attribute information of the at least one business standard object set by the user, and performing comparison, execution or calculation according to logic defined in a business logic function; and an environment abstraction layer having several objects for controlling information technology (IT) infrastructure including an operating system of a computer, a central processing unit (CPU), a memory, a database management system (DBMS), network and display apparatus, whereby the BOS selects the function of the at least one business standard object provided under the GUI interface environment and uses them in graphic object type so as to allow a user having no software development skills to easily design and implement a program execution function based on business process knowledge, and builds the at least one business standard object without a coding operation thereby to complete a final execution program.

2. The business software development system of claim 1, wherein the BOS divides the business software structure into:
mechanism function for controlling IT infrastructure including hardware device, operating system, communication protocol and DBMS input and output; and
business logic function including general business processing rule, transaction condition and commercial transaction practice,
wherein the mechanism function is provided beforehand in the BOS to all of developers and users so that any business software once developed is not developed again, but is reused, and
wherein the business logic function is stored in a file type or DB type for each application program module unit and executed by the program execution layer.

3. The business software development system of claim 1, wherein, in the case that a product, version or function of the IT infrastructure controlled directly by the environment abstraction layer is changed,
among the objects of the environment abstraction layer, only the object corresponding to the IT infrastructure is corrected in conformity with the changed environment, whereby all of the business software implemented based on the BOS is simultaneously upgraded.

4. The business software development system of claim 1, wherein in case individual business software is developed based on the BOS, the program file does not store the entity (program source or executor) of the business standard object of the program, but stores only the attribute information set in the business component setting layer, and executes program referring to the business standard object (executor) inside the BOS when the program is in practice executed, and thus when a plurality of program modules are simultaneously executed, insufficiency is prevented that similar program executors or routines are loaded or stored in a memory or a disc, and traffic is reduced in a distributed processing network environment to prevent reduction of speed or performance of the whole system.

5. A business software development method based on business operating system (BOS) in which a user selects and defines at least one business standard object in a graphical user interface (GUI) environment to generate and execute business software, the BOS comprising:
(S1) receiving and generating a user interface display of a program;
(S2) selecting the at least one business standard object of the program from a business component storage layer to determine the size and position of the display, the business component storage layer storing the at least one business standard object for defining a function of the program selected by the user through the user graphical user interface;
(S3) receiving attribute information including object type, operating type, execution condition, execution sequence and database (DBI) connection information of the at least one business standard object set by a business component setting layer, the business component setting layer setting the attribute information of the at least one business standard object;
(S4) converting information set in the steps (S2) and (S3) to structure data of an interpretable type by a application program execution layer, the application program execution layer automatically generating an execution file based on the attribute information set by the business component setting layer; and
(S5) reading the structure data, and operating and controlling the at least one business standard object by an application program execution layer according to the user's command on the display in conformity with the information set in the steps (S2) and (S3), and performing comparison, execution or calculation according to logic defined in a business logic function;
wherein an environment abstraction layer exists having several objects for controlling information technology (IT) infrastructure including an operating system of a computer, a central processing unit (CPU), a memory, a database management system (DBMS), network and display apparatus,
whereby the BOS selects and uses function of the at least one business standard object provided under the GUI interface environment in graphic object types so as to a user having no software development skills to easily design and implement a program execution function based on business process knowledge, and builds the at least one business standard object without a coding operation thereby to complete a final execution program.

6. The business software development method of claim 5, wherein in the step (S2) or (S3), the business component setting layer defines execution function of the program, after the business standard object is selected from the business component storage layer, the business standard object defining a specific function to be incorporated through the GUI interface from the user.

7. The business software development method of claim 5, wherein in the step (S2) or (S3), a GUI interface environment is provided as a graphic object under the GUI interface environment so that even a user having no software development skills defines execution function of the program based on business process knowledge.

8. The business software development method of claim 5, wherein in the step (S4), in the case of selection and building by the user, the program execution layer automatically generates an execution file by the attribute information set by the user in the business component setting layer, thereby removing a worrisome repetitive program development process including coding, compiling or debugging.

* * * * *